United States Patent [19]

Peck, Jr. et al.

[11] 4,279,277
[45] Jul. 21, 1981

[54] APPARATUS FOR MANUFACTURING A DYNAMOLELECTRIC FIELD MEMBER

[75] Inventors: Kenneth E. Peck, Jr., Pittsboro, N.C.; Harold I. Pearsall, Centerville, Ohio

[73] Assignee: The Globe Tool & Engineering Company, Dayton, Ohio

[21] Appl. No.: 75,315

[22] Filed: Sep. 13, 1979

[51] Int. Cl.³ .......................... B21F 3/00; B21F 23/00
[52] U.S. Cl. .................................................. 140/92.2
[58] Field of Search ................. 140/92.2; 29/596, 605; 72/137, 142

[56] References Cited

U.S. PATENT DOCUMENTS

| | | | |
|---|---|---|---|
| 359,205 | 3/1887 | Curtis et al. | 140/92.2 X |
| 533,323 | 1/1895 | Stanley | 307/84 |
| 581,089 | 4/1897 | Southworth | 310/218 |
| 666,008 | 1/1901 | Geisenhoner | 140/92.2 X |
| 677,308 | 6/1901 | Eickemeyer | 310/172 |
| 678,280 | 7/1901 | Riddell | 140/92.2 X |
| 766,370 | 8/1904 | Middleton | 140/92.2 X |
| 839,060 | 12/1906 | Dunn | 140/92.2 X |
| 919,510 | 4/1909 | Wood | 140/92.2 X |
| 937,328 | 10/1909 | Pomeroy | 140/92.2 |
| 975,425 | 11/1910 | Hensley | 310/194 |
| 1,012,257 | 12/1911 | Jeffrey | 310/194 |
| 1,217,943 | 3/1917 | Holst | 310/194 |
| 1,406,092 | 2/1922 | Schulz et al. | 140/92.2 |
| 1,451,374 | 4/1923 | Rogers | 140/92.2 |
| 1,506,746 | 9/1924 | Griffith | 310/194 |
| 1,630,757 | 5/1927 | Perkins | 310/180 |
| 1,920,154 | 7/1933 | Carlson | 29/605 X |
| 1,920,354 | 8/1933 | Carpenter | 310/259 |
| 2,022,154 | 11/1935 | Rothweiler | 72/145 |
| 2,251,152 | 7/1941 | Mortensen | 310/218 |
| 2,381,245 | 8/1945 | Askey | 310/194 |
| 2,474,755 | 6/1949 | Pamphelon | 140/92.2 |
| 2,479,391 | 8/1949 | Miller | 140/92.2 |
| 2,595,791 | 5/1952 | Hunt | 29/605 X |
| 2,607,816 | 8/1952 | Ryder et al. | 310/42 |
| 2,695,969 | 11/1954 | Yates | 310/259 |
| 2,756,358 | 7/1956 | Johnson | 29/605 X |
| 2,908,965 | 10/1959 | Platt | 29/596 |
| 2,913,606 | 11/1959 | Guardiola | 310/180 |
| 2,920,594 | 1/1960 | Platt | 29/732 X |
| 3,020,627 | 2/1962 | Swainson | 29/605 |
| 3,036,603 | 5/1962 | Moore | 140/92.1 |
| 3,076,110 | 1/1963 | Larson et al. | 310/194 |
| 3,156,268 | 11/1964 | Moore | 140/92.2 X |
| 3,189,059 | 6/1965 | Moore | 140/92.1 |
| 3,192,961 | 7/1965 | Moore | 140/92.1 |
| 3,206,964 | 9/1965 | Hart et al. | 29/605 X |
| 3,225,424 | 12/1965 | Wiley | 29/605 |
| 3,283,399 | 11/1966 | Hart et al. | 29/605 |
| 3,328,617 | 6/1967 | Preece | 27/596 X |
| 3,333,131 | 7/1967 | Bush et al. | 310/194 |
| 3,407,470 | 10/1968 | Gibbs | 29/732 |
| 3,436,812 | 4/1969 | Aoki et al. | 29/596 |
| 3,464,101 | 9/1969 | Zubal et al. | 29/605 X |
| 3,508,316 | 4/1970 | Hill | 140/92.1 X |
| 3,525,889 | 8/1970 | Robinson et al. | 29/596 X |
| 3,566,171 | 2/1971 | Tichy et al. | 310/180 |
| 3,577,851 | 5/1971 | Detheridge | 29/596 |
| 3,595,050 | 7/1971 | McDonald et al. | 72/112 |
| 3,624,441 | 11/1971 | Todd | 310/179 |
| 3,629,636 | 12/1971 | Hill | 310/184 |
| 3,729,968 | 5/1973 | Norris | 72/129 |
| 3,824,683 | 7/1974 | Rhudy | 29/596 |
| 3,827,141 | 8/1974 | Hallerbach | 29/596 |
| 3,845,647 | 11/1974 | Cockin | 72/137 |
| 3,877,142 | 4/1975 | Kiriya et al. | 29/596 |
| 4,077,244 | 3/1978 | Umehara et al. | 72/129 |
| 4,131,988 | 1/1979 | Finegold | 29/596 |

Primary Examiner—Richard B. Lazarus
Attorney, Agent, or Firm—Dybvig & Dybvig

[57] ABSTRACT

Apparatus for manufacturing dynamoelectric field windings having plural edge would coils formed from wire strapping includes a mandrel with a plurality of cores pieces. The mandrel is intermittently rotated about a first axis to present the core pieces to a winding station and rotated about a second axis to form an edge-wound coil about the core piece then present at the winding station. A wire feed and guide assembly having a wire forming head through which the strapping extends to the winding station assists in edge bending the strappng to form coils on the core pieces and is moved both vertically and horizontally to assist in edge bending transition strapping portions between successively wound coils. Also disclosed are a wire hook forming tool for forming a hook at the leading end of the strapping with which such leading end is held fixed to the mandrel, a wire cutting assembly for cutting the strapping to proper lengths and a movable tooling for shaping the windings as they are wound.

4 Claims, 22 Drawing Figures

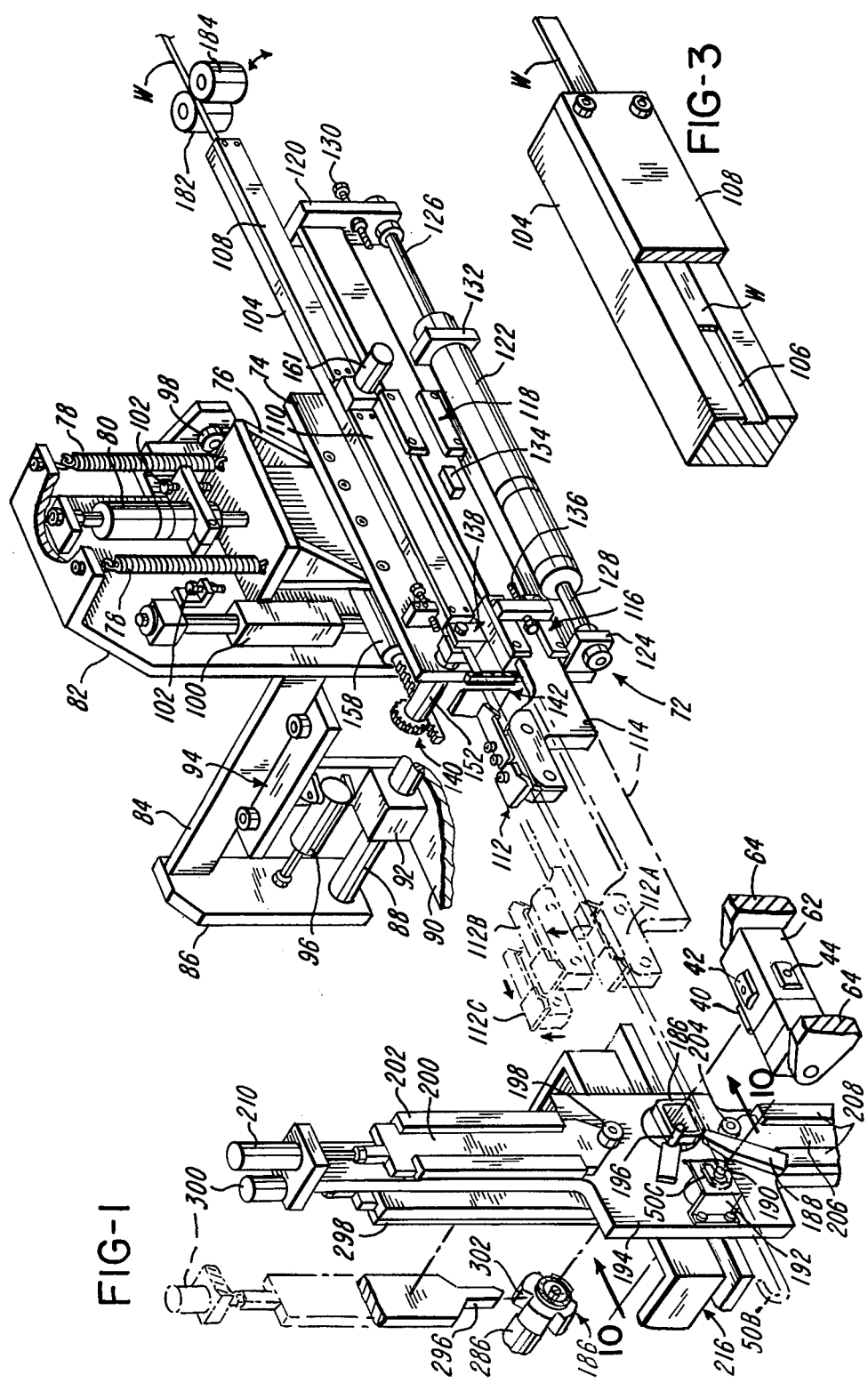

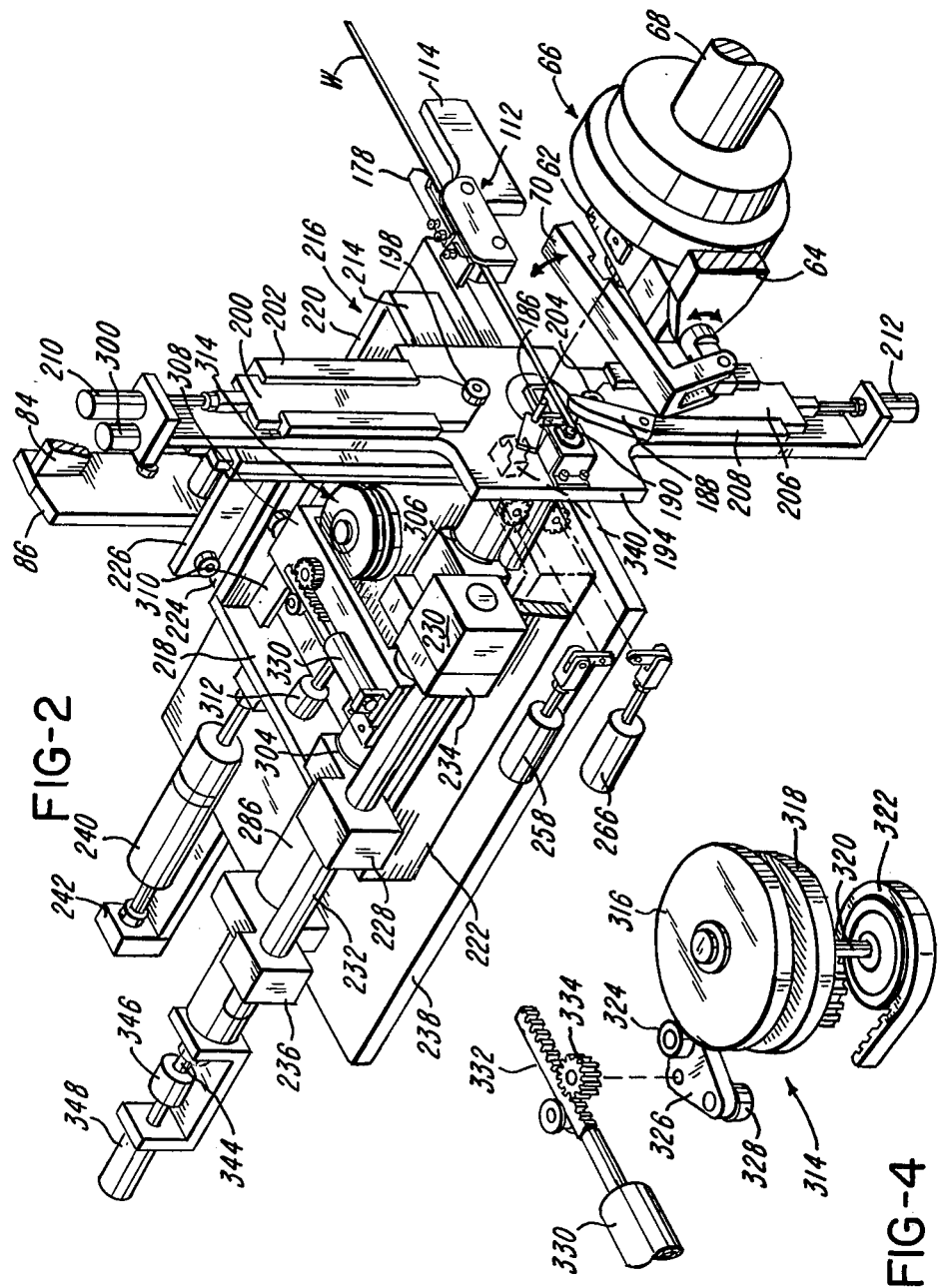

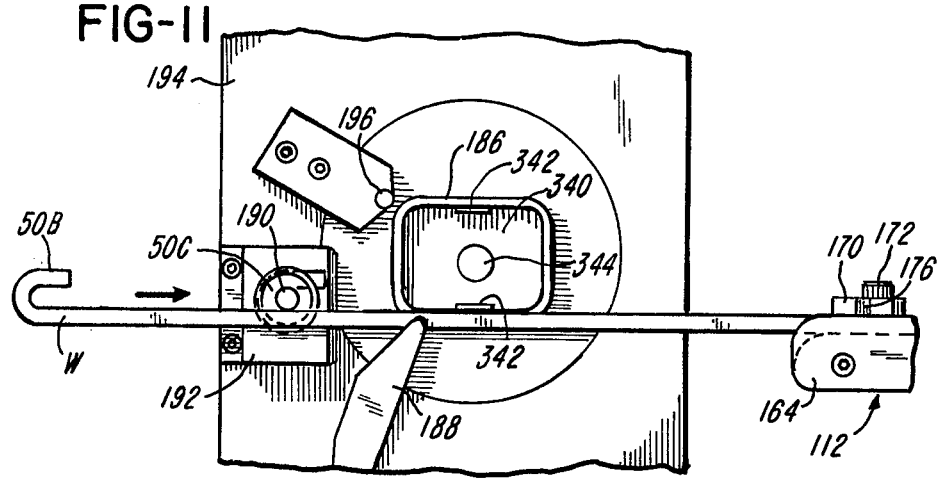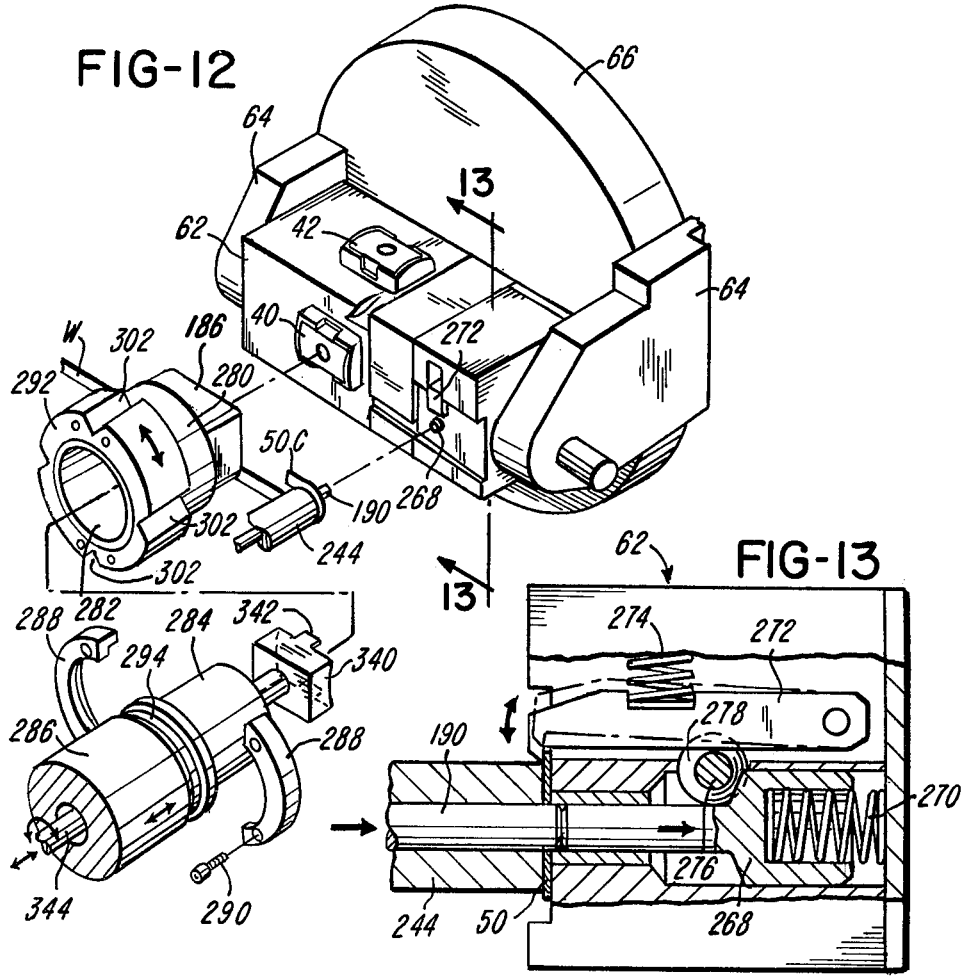

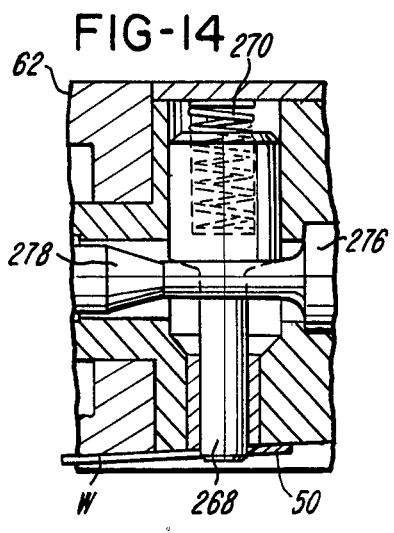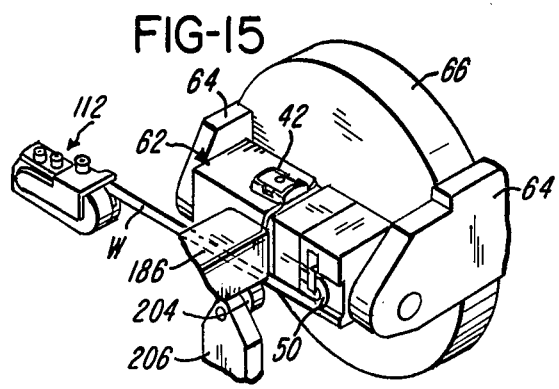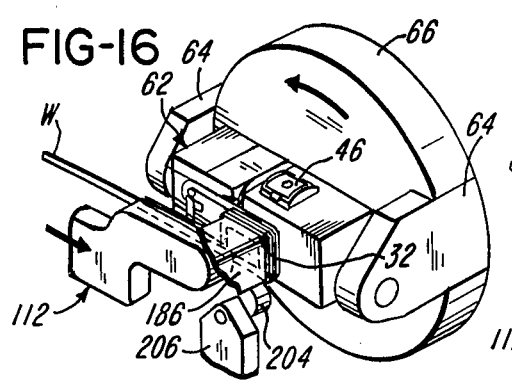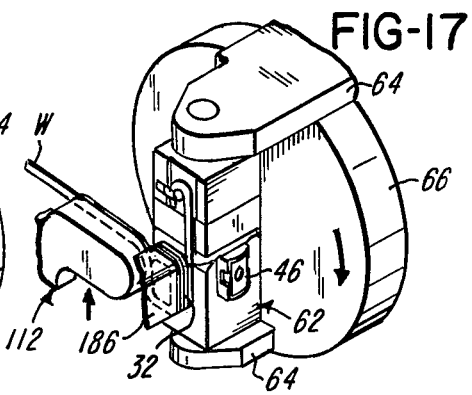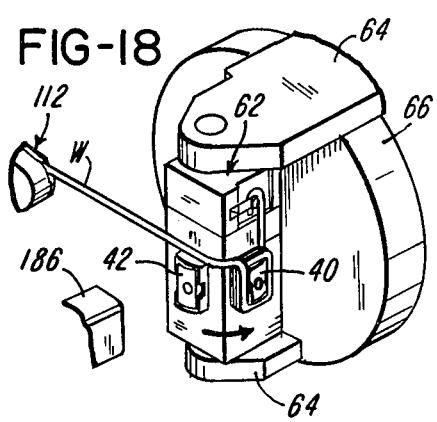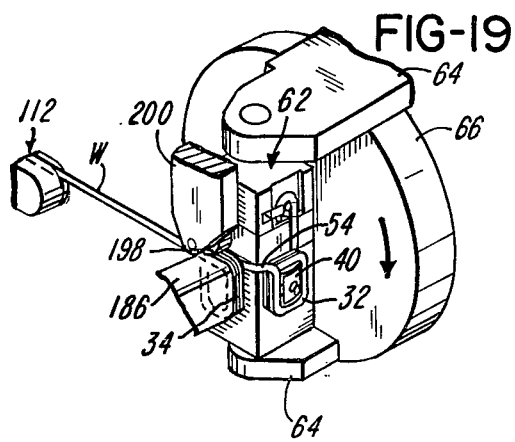

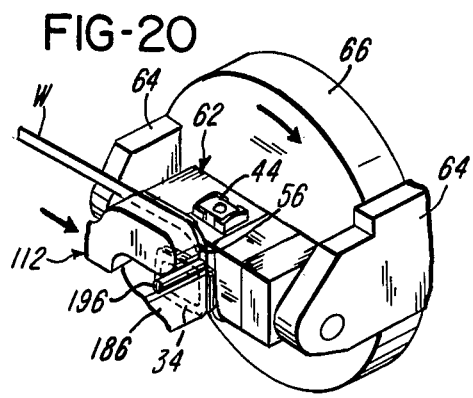
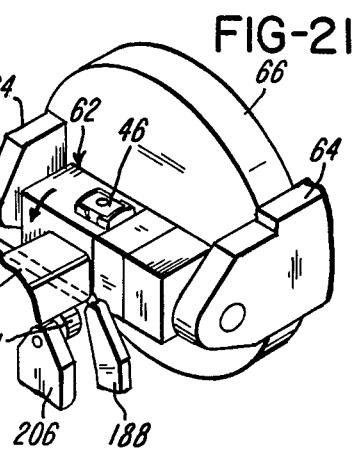
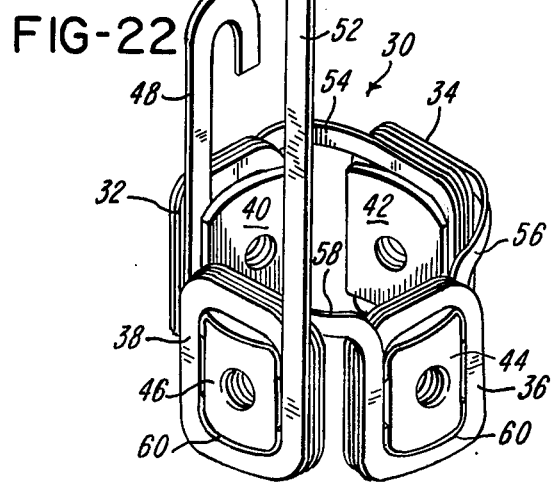

APPARATUS FOR MANUFACTURING A DYNAMOELECTRIC FIELD MEMBER

BACKGROUND OF THE INVENTION

This invention relates to the manufacture of dynamoelectric field members of the type used, for example, in the production of automobile starter motors and more particularly to a method and apparatus for manufacturing dynamoelectric field members useful in implementing the manufacture of field coils using uninterruptedly continuous rectangular wire or strapping that is edge wound around cores to form plural coils and edge bent to form transitions or connections between coils as taught in U.S. Pat. No. 4,131,988, granted Jan. 2, 1979, to Hyman B. Finegold.

In said U.S. Pat. No. 4,131,988, a winding procedure (herein termed "the Finegold method") is disclosed in which a mandrel is provided with equally radially and circumferentially spaced core pieces. Strapping is edge wound about each of the core pieces by rotation of the mandrel about a first axis. Connecting or transition wire portions between successively wound coils are formed in part by edge bending the strapping and in part by rotation of the mandrel about a second axis to present successive core pieces in position to be wound. The Finegold method provides substantial advantages over prior methods and is ideally suited for the mass production of wound coils for fields. The core pieces preferably constitute the pole pieces for a dynamoelectric field member and are only temporarily connected to the mandrel, the core pieces being removed with the wound coils for connection to a stator housing or ring.

Practice of the Finegold method in the mass production of stator fields requires apparatus for causing the strapping to follow the contours of the core pieces during the winding operation so that the position of the strapping is adequately controlled during the entire winding procedure and further requires apparatus to properly form the transition or connecting wires between coils. A copending application of Carlton O. Dickensheets, Ser. No. 834,518, filed Sept. 19, 1977, and now abandoned and assigned to the same assignee as the instant application, relates to apparatus that may be used for such purpose. However, the Dickensheets apparatus is highly complex in both construction and operation, and the need exists for simplified apparatus to implement the Finegold method.

SUMMARY OF THE INVENTION

This invention provides an improved method and apparatus for implementing the Finegold method and particularly for controlling and forming the strapping during the entire winding procedure.

In accordance with this invention, apparatus is provided for automatically forming the start end of the strapping for temporarily affixing it to the mandrel in preparation for the winding of coils and improved apparatus is provided for causing the wire to be properly shaped into coils. The latter apparatus includes a simple cam-controlled mechanism for controlling the movement of a coil guide or shoe that holds the strapping against the mandrel while winding coils.

Further in accordance with this invention, transition or connecting wire portions between coils wound about their respective pole pieces are properly formed utilizing only a single movable coil form device. This device includes a forming head having a channel through which strapping from a source of strapping is directed by a wire feed device. The wire forming head is mounted for movement toward and away from the winding station and for this purpose is movably mounted on a carriage. Drive means for accomplishing movement of the head is also mounted on the carriage. The carriage is mounted for movement on a frame in directions perpendicular to the direction of movement of the wire forming head relative to the carriage so that the wire forming device may be both moved along three axes to properly position the wire forming head relative to the mandrel. The base of the channel in the wire forming head is appropriately curved to provide a wire forming surface that is used in forming the transition or connecting wire portions between coils.

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

BRIEF DESCRIPTION OF THE DRAWINGS

FIG. 1 is a perspective view of a portion of apparatus in accordance with this invention with part of the strapping used in winding coils shown in full lines and also other parts in phantom lines to illustrate the manner of operation thereof. Machine parts are also shown in phantom lines to indicate the manner in which they operate.

FIG. 2 is a perspective view showing part of the apparatus of FIG. 1 and other apparatus in addition thereto. Here it may be noted that parts of the overall machine not directly related to the instant invention are, in some cases, not illustrated, and in other cases, are illustrated in simplified forms merely to indicate their function.

FIG. 3 is a perspective view with portions broken away of part of the wire feed mechanism of this invention.

FIG. 4 is an exploded, perspective view of a cam arrangement used for incrementally moving a coil guide or shoe during the course of the winding of a coil.

FIG. 5 illustrates the parts immediately prior to the formation of the hook, and FIG. 6 illustrates the parts immediately after the hook is formed.

FIG. 11 is a fragmentary, front elevational view of a portion of the apparatus of FIG. 10 as viewed in the direction of arrows 11—11 thereof.

FIG. 12 is a perspective view, partly exploded and partly broken away, further illustrating the manner in which the hooked end of the wire is temporarily connected to the mandrel and further illustrating the construction of the coil guide or shoe.

FIG. 13 is a view taken generally along line 13—13 of FIG. 12 of a portion of the mandrel and a portion of the means for causing the start end of the wire to be hooked to the mandrel, parts of FIG. 13 being broken away and parts shown in cross-section.

FIG. 14 is a cross-section of a portion of the mandrel generally transverse to parts of the mandrel shown in FIG. 13.

FIGS. 15 through 21 are simplified perspective views illustrating in sequence the manner in which the mandrel is rotated to form coils and transition or connecting portions between coils and also illustrating the operation of the wire forming device of this invention and the manner in which the wire is maintained under control during the winding procedure.

FIG. 22 is a perspective view of the completed field windings for dynamoelectric machines wound from a continuous, uninterrupted length of wire strapping in accordance with this invention, the coils being wound around core pieces that have been removed with the coils from the mandrel.

DESCRIPTION OF THE PREFERRED EMBODIMENT

Figure 5:
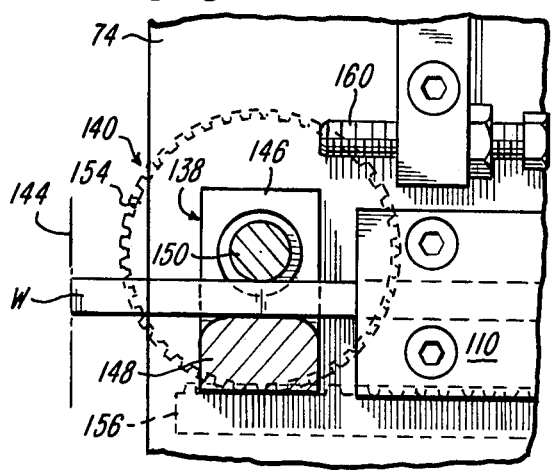
FIGS. 5 and 6 are fragmentary, elevational views with parts in section illustrating the apparatus for forming the start end of a length of wire strapping with a hook.

This invention is concerned with the manufacture of field windings for dynamoelectric machines of the type generally designated 30 in FIG. 22 and comprising plural, successively wound coils. In the illustrated embodiment, there are four such coils identified as 32, 34, 36 and 38. The coils are wound in accordance with the Finegold method from a single, continuous, uninterrupted strand of rectangular wire strapping, which is edge wound in succession around respective core pieces 40, 42, 44 and 46. The core pieces preferably constitute pole pieces which are provided with tapped holes for later connection to the inside of a stator housing or ring. The particular field winding 30 illustrated in FIG. 22 includes a start wire portion 48, the bitter end of which is formed with a hook 50, and a finish wire portion 52 extending uninterruptedly from the last wound coil 38. The same wire used in forming the coils and the start and finish wires is edge bent to form transition or connecting wire portions designated 54, 56 and 58 between the successively wound coils. As those familiar with the construction of field members for dynamoelectric machines will be aware, the pole pieces 40, 42, 44 and 46 are separated from the coils by insulating sleeve members 60 and the wire from which the coils are formed has an insulating coating. The coating may be removed from parts of the start and finish wires 48 and 52 or from parts of the transition wire portions 54, 56 and 58 to form brush and other electrical connections. In a typical stator, the start or the finish wires, or both of them, may be subject to further forming operations for later mechanical and electrical connection within the stator housing.

It may be noted in FIG. 22 that the second coil 34 is wound in the opposite rotative sense from the first coil 32 and that the first transition wire portion 54 extends from that side of the first pole piece 40 which is nearest to the second pole piece 42. Further, the first transition wire 54 extends over the top of the second pole piece 42 at the commencement of the winding of the second coil 34. The third coil 36 is wound relative to its pole piece 44 in the same rotative direction as the first coil 32. The second transition wire portion 56 differs from the first transition wire portion 54 in that it extends from the top of the second pole piece 42 toward the third pole piece 44, then downwardly along the side of the third pole piece 44 nearest the second coil 34. Finally, the fourth coil 38 is wound in the opposite rotative sense from the third coil 36. Accordingly, the third transition wire portion 58 is essentially the same as the first transition wire portion 54. It will be understood by those familiar with the construction of field windings for dynamoelectric machines that the construction of the start and finish wire portions 48 and 52 and the specific rotative direction that any particular coil is wound will vary depending upon the design criteria established by the manufacturer. However, in every case there will be at least a start wire and a finish wire and transition wire portions similar to the illustrated transition wire portions 54, 56 and 58. This invention provides apparatus and method for forming the entire field winding 30 and cutting it free from the wire supply. Among other things, this invention provides a remarkably simple approach to formation of the transition wire portions 54, 56 and 58. Although details of construction of field windings made in accordance with this invention may vary, the principles of operation and construction of the apparatus to be described herein below will be applicable to the manufacture of a wide variety of field windings.

With reference to FIGS. 1 and 2, the core pieces 40, 42, 44 and 46 are secured to a mandrel 62 in preparation for the winding of coils. The mandrel 62 is supported for rotation about its major axis and about an axis perpendicular to its major axis, the precise manner of support not being a part of this invention. For purposes of illustration, the mandrel 62 is shown supported by a pair of yoke arms 64 forming part of a yoke assembly 66 that may be rotated by a yoke drive shaft 68 during the winding of coils. The axis of rotation of the mandrel 62 when driven by the yoke drive shaft 68 is perpendicular to its major axis and extends centrally through a core piece located in position to have wire strapping wound therearound. The mandrel 62 is also rotatably supported by the yoke arm 64 for rotation about its major axis, the manner of achieving such rotation being unimportant to this invention. After a coil is wound around one pole piece, a coil clamping member 70 (FIG. 2) mounted for pivotal movement on the yoke assembly 66 is moved into coil clamping relation with respect to the pole piece at the winding station and is indexed about the axis of the mandrel 62 so as to remain clamped over the newly wound coil while the succeeding coil is being wound. This operation of the coil clamp member 70 indicated by the arrows in FIG. 2 is repeated at the end of the winding of each coil. Again, it does not perform part of the present invention and is only illustrated herein in greatly simplified form.

For convenience, the general area in which the mandrel 62 is located is referred to herein as the winding station. In accordance with this invention, the wire strapping designated W used in forming the field coils is fed to the winding station by a wire feed guide and forming assembly, generally designated 72, mounted on a main plate 74 that in turn is fixedly mounted on a vertically movable support carriage 76. The support carriage 76 is supported by springs 78 and a wire guide lifting cylinder 80 to a horizontally movable support carriage 82 that includes a rearwardly extending arm 84, a rear plate 86 and a guide rod 88, the carriage 82 being slidably supported for movement in a horizontal direction relative to the machine frame 90 by guide and support members 92 and 94. The horizontal position of the wire guide and former carriage 82 is controlled by a wire guide positioning cylinder 96 that may be connected between the machine frame 90 and the carriage rear plate 86. The vertically movable support carriage 76 may be guided by guide members 98 and 100, and the elevated positions thereof determined by adjustable stops 102.

The wire guide and forming assembly 72 mounted on the main plate 74 comprises an elongate guide block 104 affixed to the main plate 74 and having a longitudinally extending groove 106 (FIG. 3) that receives and guides the strapping W, which is held in the groove 106 by a pair of elongate cover plates 108 and 110 bolted to the guide block 104. The strapping W exits from the downstream end of the elongate guide block 104 and then extends through a wire forming head, generally designated 112, that is affixed to one end of an elongate forming head support plate 114. The support plate 114 is guided for horizontal movement in gibs or guides generally indicated at 116 and 118 and horizontally positioned by a drive link 120 drivingly engaged by a forming head drive cylinder 122 connected between the drive link 120 and a bracket 124 affixed to the main plate 74.

The forming head drive cylinder 122 is a compound cylinder. In FIG. 1, its piston rods 126 and 128 are shown fully extended whereupon the forming head 112 is maximally retracted from the winding station. This position can be determined by internal stops within the cylinder 122. Extended positions of the forming head 112 closer to the winding station, for purposes to be described below, are obtained by retraction of the piston rod 126 into the cylinder 122 and then retraction of the piston rod 128 into the cylinder 122. The locations of the forming head 112 upon retraction of the piston rods 126 and 128 is accurately determined by a first pair of cooperating abutments 130 and 132 associated with the operation of the piston rod 126 and a second pair of cooperating abutments 134 and 136 associated with the operation of the piston rod 128.

A wire hook forming tool 138 forming part of a hook bending assembly 140 is located in the path of the wire strand W between the wire guide block 104 and the wire forming head 112. Downstream of the wire hook forming tool 138 and upstream of the wire forming head 112 there is located a wire cutting assembly, generally designated 142, that may comprise a movable cutting blade and a fixed shear member or some other suitable cutting assembly, the details of which form no part of this invention.

Figure 6:
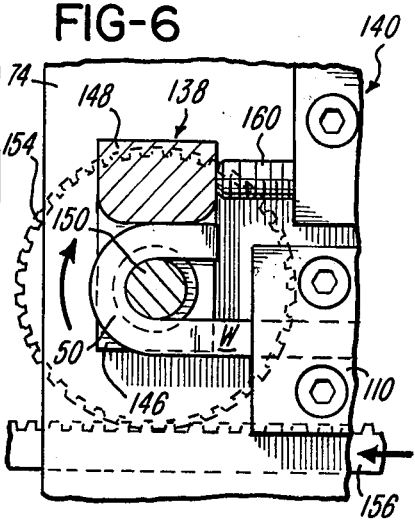
Figure 7:
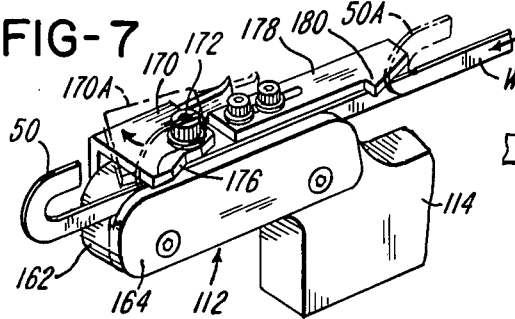
FIG. 7 is a fragmentary, perspective view of a portion of the wire forming means of this invention illustrating the manner in which the hooked portion of the strapping is extended therethrough.
Figures 8, 9:
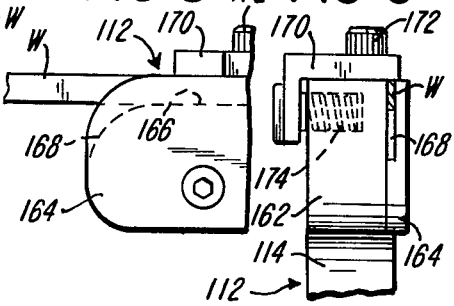
FIGS. 8 and 9 are fragmentary side and end elevation views, respectively, of portions of the wire forming means of FIG. 7.

With reference to FIGS. 1, 5 and 6, the leading end of the wire strapping W is edge bent to form the hook 50 in preparation for the winding of coils. To appropriately align the strapping with other parts of the machinery to be described below, the piston associated with the wire guide positioning cylinder 96 is extended so that the wire guide and forming assembly 72 is in a retracted position. With reference to FIG. 5, the extreme forward end of the wire W is located at a shear line 144 as determined by operation of the cutting assembly 142. For purposes of this discussion, it is assumed that the forward end of the strapping is in this position as a result of the operation of the cutter assembly 142 during the terminal part of the winding the preceding set of coils.

The hook bending tool 138 comprises a metal block 146 slotted to receive the strap W, the base 148 of the slot providing a sliding surface therefor. The tool further comprises a hook forming pin 150 traversing the slot in the block 146 and spaced from the slot base 148 by a distance substantially equal to, but greater than, the height of the strap W. The pin 150 has a circular circumference about which the forward end of the wire W may be bent to form the hook 50. The pin 150 is located on an axis perpendicular to the plane containing the major (height) dimension of the wire strapping W and is coincident with the axis of rotation of a drive shaft 152 that is connected in any suitable manner to the block 146. The end of the drive shaft 152 opposite the block 146 is provided with a pinion 154 engaged by a rack 156 that is linearly driven by a hook drive cylinder 158 (FIG. 1) mounted in fixed relation to the main plate 74.

As apparent from a comparison of FIGS. 5 and 6, the rack 156 may be driven in the direction of the arrow in FIG. 6 causing the metal block 146 to rotate about the axis of the pin 150 whereupon the slot base 148 causes the end of the wire trapped between it and the pin 150 to be wrapped about the pin 150 to form the hook 50. The particular hook illustrated in the drawings is designed to have its free end portion bent through a total angle of 180° to ensure that a hook of that shape will be formed, an adjustable stop 160 is located in the path of movement of the bending tool 138, the stopped position thereof being illustrated in FIG. 6. After the hook 50 is thus formed, the rack 156 is driven in a reverse direction by the hook bending cylinder 158 to return the block 146 back to the position thereof illustrated in FIGS. 1 and 5. Because of the high pressures involved in bending the strapping to form the hook 50, it may be necessary to clamp the strapping during the hook forming operation. For this purpose, a wire clamp cylinder 161 is illustrated in FIG. 1 that has a piston (not shown) which is urged by operation of the cylinder 161 into clamping engagement with the strapping W in the wire guide groove 106. Of course, the clamp cylinder 161 is only energized when the hook 50 is being formed so as not to resist movement of the strapping at other times.

With reference to FIGS. 1 and 7-9, the wire forming head 112 comprises a mounting plate 162 that may be connected to or comprise an extension of the support plate 114, and a face plate 164 affixed to the mounting plate 162. The surface of the face plate 164 confronting the mounting plate 162 is cut away along its upper edge to form a channel for receiving wire strapping W, the base of the channel being indicated by the reference character 166. The leading or downstream end of the channel base 166 has an arcuately curved surface 168 (FIG. 8) that is used in the formation of transitions or connections between coils, as will be described below.

To maintain the wire strapping W within the channel in the wire forming head 112, a pivoted retaining plate 170 is provided that overlies the channel. It is connected to the mounting plate 162 by a pivot pin 172 and is biased by a spring 174 (FIG. 9) into covering relation to the channel. The edge of the retaining plate 170 generally overlying the channel is formed with a rearwardly facing, angled surface portion 176 so that, as the hook 50 is moved through the channel, it engages the angled surface 176 and thus pivots the retaining plate 170 out of the way, generally into the position indicated by phantom lines 170A in FIG. 7. After the hook 50 has moved past the retaining plate 170, the plate 170 is returned to its channel covering position by the spring 174. To assist in holding the wire within the channel, a fixed retaining plate 178 may be mounted on top of the mounting plate 162. The fixed retaining plate 178 lies adjacent the channel in the wire forming head 112 for a substantial portion of its length and extends rearwardly of the wire forming head 112. Adjacent its rearward end, the plate 178 has a hook-like part 180 overlying the path of the strapping W intermediate the wire forming head 112 and the downstream end of the guide block 104. The rearwardly facing surface of the hook-like part 180 is angled so that, as the strapping W approaches the wire forming head 112, the upper part of the hook 50 is cammed slightly to one side into the phantom line designated 58 in FIG. 7. After the hook 50 passes the hook-like part 180, it returns to its initial path so that the strapping W will enter the channel in the wire forming head 112.

With reference to FIG. 1, the strap W is driven by powered feed rollers 182 and 184 from a strapping source, such as a conventional spool and a dereeler assembly, when the wire hook 50 is extended from the wire hook tool 138 and into and beyond the wire forming head 112. The feed rolls 182 and 184 continue to operate until the hook 50 extends past the winding station so that the hook 50 is located in the position illustrated by phantom lines 50B in FIG. 1. This is also the full line position of the hook 50 illustrated in FIG. 11.

With reference to FIGS. 1 and 11, the wire hook 50, as it moves from the wire forming head 112 past the winding station, passes in front of a coil guide or winding shoe 186 adjacent a wire support finger 188 and also past a hook catch pin 190 and a wire deflector 192. The winding shoe 186 extends through an aperture in a coil tooling mounting plate 194 upon which the support finger 188 and the wire deflector member 192 are mounted.

As the hook 50 is extended into the position shown in FIG. 11, the wire forming head 112 is moved toward the winding station by operation of the forming head drive cylinder 122 to retract its piston 126. Nevertheless, there is a substantial length of strapping W extended beyond the wire forming head 112, as illustrated in FIG. 11, so that there may be a tendency for the strapping W to fall forward or away from the mounting plate 194. Therefore, as a precaution, the strapping W moves in a plane between the face of the tooling mounting plate 194 and the upper portion of the finger 188 so that the finger 188 and the deflector 192 prevent the strapping W from falling out of its intended path. The finger 188 also provides a wire support function during the winding operation that will be described below. A transition wire guide 196 is mounted on the face of the tooling mounting plate 194, also for use during the winding operation.

With reference to FIGS. 1 and 2, an upper coil forming roller 198 is mounted at the lower end of an upper slide 200, which is guided by gibs or ways 202 for vertical movement toward and away from the center line of the coil winding shoe 186. A lower coil forming roller 204 is similarly mounted on a lower slide 206 and guided in gibs 208 for vertical movement, again toward and away from the center of the shoe 186. An upper roller positioning cylinder 210 is provided for the positioning of the roller 198, and a lower roller drive cylinder 212 is provided for positioning the lower drive roller 204.

The tooling mounting plate 194 is mounted on the front wall 214 of a rectangular framework or tooling mounting carriage 216 having a rear wall 218 parallel to the front wall 214, a right side wall 220 and a left side wall 222. A flange 224 extends from the right side wall 220 and is associated with a guide member 226 having rollers for supporting the right side of the tooling mounting carriage 216. A pair of guide blocks 228 and 230 connected to the left side wall 222 are slidably mounted on a guide shaft 232 that is supported by support blocks 234 and 236 upon a frame base plate 238 that may be mounted on or integral with the machine frame 90. The entire carriage 216 and the mounting plate 194 carried thereby are moved toward and away from the mandrel 62 by a tooling positioning cylinder 240 connected between the carriage rear wall 218 and a bracket 242 that is fixed to the frame base plate 238.

When the parts are positioned as illustrated in FIGS. 1, 2 and 11, the carriage 216 and the mounting plate 194 are retracted away from the mandrel 62. This condition occurs after the winding of one set of coils and in preparation for the winding of the next set of coils. At this same time, the horizontally movable wire guide and forming carriage 82 is in its retracted position as described above so that the wire strapping W will be moved along a path quite close to the front face of the coil tooling plate 194. Here it may be noted that the various cylinders used to position various parts of the apparatus of this invention are preferably air actuators or cylinders. The operations of the cylinders and other parts of the machine are appropriately synchronized by machine control circuitry, the structure and operation of which can be entirely conventional and is, therefore, not described herein.

Figure 10:
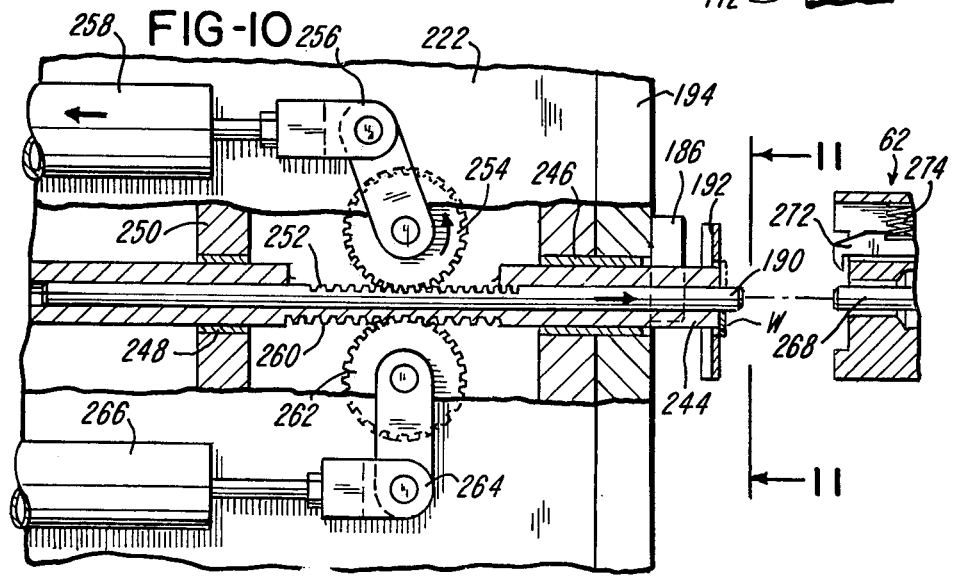
FIG. 10 is a fragmentary, elevation view taken on line 10—10 of FIG. 1, with parts broken away and parts in section of apparatus for temporarily connecting the hooked start end of the wire strapping to the mandrel.

After the hook 50 is extended to the position thereof shown in FIG. 11, it is temporarily retained on the hook catch pin 190 so that it will move with the tooling mounting plate 194 when the latter plate is extended toward the mandrel 62. With reference to FIGS. 2 and 10, the pin 190 is slidably mounted within an elongate sleeve 244 that, in turn, is slidable on a bushing 246 mounted in aligned apertures in the tooling mounting plate 194 and the carriage front plate 214 and also slidable on a bushing 248 mounted in supplemental support plate 250 affixed to the carriage left side wall 222. A portion of the sleeve 244 is cut away to expose a toothed portion of the pin 252 that is engaged by a pin drive pinion 254 connected by linkage 256 to a pin positioning cylinder 258 mounted on the carriage left side wall 222. The arrows associated with the pin drive pinion 254 and the pin positioning cylinder 258 indicate that the drive pinion 254 has been rotated by operation of the cylinder 258 to extend the hook catch pin 190 a small distance toward the mandrel 62 past the wire deflector 192. In order for the hook 50 to have reached the position shown in FIG. 11, the pin 190 was retracted by operation of the pin positioning cylinder 258 and the extension of the pin 290, as shown in FIG. 10, occurs immediately after the hook 50 reaches the position shown in FIG. 11. At this time, the wire feed rollers 182 and 184 are driven in a reverse direction so that the hook 50 is moved in the direction of the arrow shown in FIG. 11 whereupon it ultimately engages the pin 190 and occupies the position illustrated by phantom lines 50C in FIGS. 1 and 11.

The parts are now in readiness for the tooling mounting plate 194 to be moved toward the mandrel 62. This is accomplished by operation of the tooling plate drive cylinder 242 and simultaneously by operation of the wire guide positioning cylinder 96, both of which are moved toward the vertical plane of the confronting face of the mandrel 62 through the same distance so as to maintain the same relative path for the wire strapping therebetween. To accommodate the motion of the wire guide and forming assembly 72, the feed roller 184 is pivoted out of the path of the wire strapping W so as not to bend the length of the strapping between the feed rolls 182 and 184 and the wire guide block 104. As will become apparent, the feed rolls 182 and 184 are not used in driving or feeding the wire W after the hook 50 engages the hook catch pin 190. Therefore, the feed roll 184 may be moved away from the roll 182 without otherwise affecting the operation of the machine.

The mandrel 62 includes a housing for slidably supporting a hook latch pin 268 shown best in FIGS. 12, 13 and 14 that is aligned with the hook catch pin 190. As the tooling mounting plate 194 approaches the mandrel 62, the hook catch pin 190 is advanced toward the mandrel 62 so that, as shown in FIG. 13, the hook catch pin 190 abuts the confronting face of the hook latch pin 268 pushing it rearwardly against the bias of the spring 270 until the catch pin 190 enters the mandrel opening that receives the latch pin 268. Thereafter, the elongate sleeve 244, which has a toothed portion 260 engaged by a drive pinion 262 connected by drive linkage 264 to a sleeve positioning cylinder 266, is driven forwardly by operation of its positioning cylinder 266 toward the mandrel 62 to engage the hook 50 and press it against the confronting face of the mandrel 62. This movement of the hook 50 is accompanied by a camming of a hook latch finger 272 against the bias of a spring 274 immediately followed by the return of the hook latch finger 272 to its full line position shown in FIG. 13 wherein it extends partly over the hook 50. The pin 190 may then be retracted by its positioning cylinder 258, which is accompanied by return of the pin 268 under bias of its spring 270 so that it extends out of the mandrel 62 and projects through the bight of the hook 50. The sleeve 244 is then retracted by its positioning cylinder 266 whereupon the hook latch pin 268 and the hook latch finger 272 cooperate to retain the hook 50 on the mandrel 62 during the winding operation that will be described below. When the winding is completed, the hook 50 may be released from the mandrel 62 by movement of a cam shaft 276 shown in FIGS. 13 and 14 having a sloping surface 278 that, upon movement to the right as viewed in FIG. 14, engages both the hook latch pin 268 and the hook latch finger 272 to move them out of engagement with the hook 50. The cam shaft can be driven in any suitable manner to thus affect release of the hook 50.

During the winding operations described below, the forming rollers 198 and 204 are extended into engagement with the wire strapping W in alignment with the core pieces about which the strapping is being wound. The particular one of the rollers 198 and 204 that is being used will depend upon the direction of rotation of the mandrel 62 being used for winding. Thus, the strapping W is edge bent as necessary to form the coils by pressures exerted on it by virtue of its being trapped between one of the forming rollers and the core piece on which the coil is being formed. As the coil is being formed, the coil guide or shoe 186 is positioned as closely adjacent the mandrel 62 as possible to provide just enough room for each turn of the coil to be formed. That is, the shoe 186 is initially positioned in a location surrounding the core piece on which the coil is to be wound and spaced from the confronting surface of the mandrel 62 by a spacing substantially equal to the thickness of the strapping W. As each turn of a coil is formed, the shoe 186 must move further from the mandrel 62 by a distance substantially equal to the thickness of the wire W to provide room for the next coil turn.

Referring to FIG. 12, the shoe 186 includes its rectangular forward end portion, observed for example in FIGS. 1, 2 and 11, and an enlarged, cylindrical rear portion 280 that is rotatably mounted by a bearing 282 onto the forward end 284 of a hollow, tubular shoe positioning shaft 286. The shoe 186 is restrained against axial movement relative to the positioning shaft 286 by split ring parts 288 connected as by bolts 290 to the rear face 292 of the shoe 186 and riding in an annular groove 294 formed in the positioning shaft 286. The shoe 186 is thus mounted on the positioning shaft 286 so that it is free to rotate with the core piece, such as the core piece 40, which it encompasses as the coil is being wound.

During those intervals in which the shoe 186 is retracted from the mandrel 62, the rotary orientation of the shoe 186 is maintained by means of a pin and slot arrangement comprising a shot pin 296 slidable in gibs 298 on the rear face of the tooling mounting plate 194 and positioned by a shot pin cylinder 300 located adjacent the upper roller drive cylinder 210. The shot pin 296 is positioned to enter any one of four slots or notches 302 equally circumferentially spaced about the rearward end of the shoe 186. Each of the notches 302 is aligned with a face of rectangular foward end of the shoe 186 so that the shoe 186 will in every case be temporarily held by the shot pin 296 in every possible stop position of the shoe 186, as will be made clear from the following discussion.

With reference to FIG. 2, the shoe positioning shaft 286 is slidably mounted in bearings 304 and 306 located within parts of the aforementioned guide blocks 228 and 230. A shoe drive carriage 308 is located inside the tooling positioning carriage 216. The left side of the shoe drive carriage 308 as viewed in FIG. 2 is clamped to the shoe positioning shaft 286 and the right side of the shoe positioning carriage 308 is guided for rolling or sliding movement along a flange 310 affixed to the inner face of the right side wall 220 of the tooling positioning carriage 216. The shoe carriage 308 is connected to the positioning carriage rear wall 218 by a shoe biasing cylinder 312, the piston of the cylinder 312 being connected to the shoe carriage 308 in any suitable fashion.

The movement of the shoe carriage 308 upon actuation of the cylinder 312 is restricted by a layering cam assembly, generally designated 314 and shown in FIGS. 2 and 4. The layering cam assembly includes an upper cam plate 316 and a lower cam plate 318 keyed to a vertical shaft 320 rotatably driven by a timing belt 322 through a reduction drive system (not shown) in synchronism with the rotation of the yoke drive shaft 68. The upper cam plate 316 is engagable by an upper cam follower 324 mounted on a cam follower selector plate 326 and the lower cam plate 318 is engagable by a lower cam follower 328, also mounted on the cam follower selector plate 326. There are two cam plates and followers to accommodate opposite directions of rotation of the yoke drive shaft 68. Thus, when a coil is being wound in one rotative direction, the cam plate 316 could be engaged by the follower 324. Whereas, when winding a coil in the opposite rotative direction, the lower cam plate 318 would be engaged by the lower cam follower 328. The selection of the follower 324 or 328 to be engaged with its associated cam plate is made by actuation of a selector cylinder 330 that drives a rack 332 engaged with a pinion 334 drivingly connected to the follower selector plate 326.

The rectangular free end of the shoe 186 is hollow to receive the pole pieces 40 and to be rotated by the pole pieces 40 when the mandrel 62 is rotated. However, as each coil is being formed and the shoe 186 retracted further from the mandrel 62 to accommodate succeeding turns of the coils, there may be insufficient engagement between the core piece and the inside of the shoe 186 to reliably cause the shoe to continue rotating with the core piece. Accordingly, the shoe drive member 40 is provided with forwardly extending tongues 342 (FIGS. 11 and 12) sized to interfit with mating parts of the core pieces or, as illustrated, with notches in the insulating sleeves surrounding the core pieces so that the tongues 342 positively cause the shoe drive member 340 to rotate with the core pieces. The peripheral surfaces of drive member 340 are sized and shaped to closely interfit the inside rectangular portion of the shoe 186. Therefore, the shoe 186 invariably rotates with the drive member so long as the tongues 342 are engaged with the core pieces. With reference to FIGS. 2 and 12, the shoe drive member 340 is connected to a positioning shaft 344 extending through the center of the shoe positioning shaft 286 and is connected by a coupling 346 to a positioning cylinder 348. The coupling 346 may be a conventional device for permitting the positioning shaft 344 to rotate with the shoe drive member 340.

When the tooling plate drive cylinder 240 has retracted the tooling mounting plate 194 away from the mandrel 62, the shoe biasing cylinder 312 is actuated to retract its piston and, therefore, retract the shoe carriage 308 and the shoe 186. This is done at the beginning of a winding sequence in order to remove the shoe 186 from a position that would interfere with the feed of the wire strapping W past the hook catch pin 190. Immediately after the tooling plate drive cylinder 240 is subsequently energized to move the tooling plate 194 into position for the winding of coils, both the shoe positioning cylinder 312 and the shoe drive positioning cylinder 348 may be simultaneously energized. Accordingly, the tongues 342 enter the notches in the insulating sleeves surrounding the core pieces.

Throughout the entire winding of each coil, the cylinder 348 remains under pressure so that the shoe drive member 340 will be positively driven.

Actuation of the shoe positioning cylinder 312 causes the shoe carriage 308 to be moved forwardly towards the mandrel 62, and such forward movement will continue until it is stopped by engagement of the selected one of the cam followers 324 and 328 with one of the layering cams 316 and 318. The rotary position of the selected cam will be such that, following actuation of the cylinder 312, the shoe 186 will be positioned quite close to the confronting face of the mandrel 62 to provide just sufficient space between the forward end of the shoe 186 and the mandrel 62 for one thickness of the wire strapping W. The parts are then in readiness for commencement of the winding of coils.

The winding operation proceeds as follows. Referring to FIG. 15, at the start of the winding operations, the hook 50 is connected to the mandrel 62 with the wire strapping W extending along the underside of the core piece 40 (not shown in FIG. 15) and the strapping is trapped between the shoe 186 and the mandrel 62.

The lower drive roller cylinder 212 is energized so that the strapping is also trapped between the core piece 40 and the lower drive roller 204. At this time, the wire guide lifting cylinder 80 has been actuated to extend both its pistons so that the wire guide and former assembly 72 and, accordingly, the wire forming head are at their lowermost positions. In FIG. 1, the lowermost position of the wire forming head 112 is illustrated by phantom lines 112A. In this lowest position, the strap receiving channel in the wire forming head 112 is aligned substantially along the lower side of the core piece 40. Depending upon the size of the core piece and the size and stiffness of the wire strapping, the winding head 112 may be left in the position 112A, shown in FIG. 1, during the winding of the first coil or it may be retracted to its full line position shown in FIG. 1 or located at some intermediate position. Generally speaking, the wire forming head 112 would be desirably placed reasonably close to the mandrel 62 to maintain good control over the position of the wire, yet far enough away that undue stress or bending of the wire will not be created during the winding procedure.

With the parts in readiness for the winding of the first coil, the yoke assembly 66 is rotated in a counterclockwise direction, as indicated by the arrows thereon in FIG. 16. During such rotation, the lower coil forming roller 204 causes the strapping W to follow the contour of the core piece, thereby causing it to be edge wound onto the core piece. Because the core piece is rectangular, the roller drive cylinder 212, when actuated, maintains a constant pressure so that the roller 204 closely follows the contours of the core piece. At the end of the winding of each turn of the coil, the shoe 186 is retracted by a spacing equal to one wire thickness by operation of the layering cam assembly 314. A typical wire thickness is on the order of 0.050" so that layering cams have series of stepped peripheral surfaces increasing by approximately 0.050" diameter each step. (Since so small, the cam steps are not represented in the drawings.) As the next step is reached, the layering cam, engaged by its cam follower, forces the shoe carriage 308 to overcome the bias of the cylinder 312 to retract the shoe positioning shaft 286 by the same distance of approximately 0.050". Of course, the same principles are applicable to wires having thicknesses of other than 0.050 inches in which case the cam steps would again match the wire thickness.

At the end of the winding of the first coil, the parts are in the position illustrated in FIG. 16, and the yoke assembly 66 is at rest. The major axis of the mandrel 62 is horizontal, and the winding head 112 is still in its lowest position. To form the transition or connecting wire portion 54 leading from the first coil 32, the lower roller drive cylinder is actuated to retract the lower coil forming roller 204 from the winding area. At this time, both pistons 126 and 128 of the forming head drive cylinder 122 are retracted so that the wire forming head 112 is moved into the winding station in the direction of the arrow thereon in FIG. 16, such movement continuing until it is stopped by engagement of the wire forming head 112 with the winding shoe 186. In FIG. 16, it will be noted that the longer dimension of the newly wound coil 32 is horizontal, and the channel in the wire forming head 112 is aligned with the lower side thereof. The transition or connecting portion 54 leading from the first coil 32 is formed by an edge bending step accomplished by energizing the lifting cylinder 80 to bias the wire forming head 112 upwardly as indicated by the vertical arrow in FIG. 17 while at the same time reversely rotating the yoke assembly 66, i.e. in the clockwise direction as illustrated by the arrow thereon in FIG. 17 through a 90° angle. Both the lifting cylinder 80 and the forming head drive cylinder 122 remain actuated to cause the free end of the wire forming head 112 to retain its engagement with the shoe 186 while following closely along the corner of the coil 32 from which the transition wire portion 54 extends. Accordingly, as the coil 32 is being rotated in the clockwise direction from its position in FIG. 16 to its position in FIG. 17, the wire forming head 112 is moving upwardly and at the same time is moving toward the axis of the coil 32 so that it remains engaged with the winding shoe 186 while the shoe is being rotated. Consequently, and because the wire is retained within the channel in the wire forming head 112 by the retaining plate 170 (not shown in the sequence diagrams to avoid a confusion of lines), the wire strapping is edge bent immediately adjacent the coil 32, and the wire forming head 112 is brought to a mid-height position with the base 166 of its strapping receiving channel aligned generally with the top of the core piece. This mid-height position of the head 112 may be determined by engagement of the lifting carriage 76 with one of the adjustable stops 102. The mid-height position of the wire forming head 112 is diagrammatically illustrated by phantom lines 112B in FIG. 1.

After the parts have reached the position illustrated in FIG. 17, the wire forming head 112 is retracted by operation of its drive cylinder 122 but maintained in its mid-height position. The tooling mounting plate 194 carrying with it the shoe 186 is also retracted. At this time, the coil clamping member 70 is operated to engage and hold the coil 32 in position on the mandrel 62. The mandrel 62 is then rotated about its major axis, which is now vertical, through 90° to present the second core piece in position to have a coil wound therearound, this direction of mandrel rotation being indicated by the arrow thereon in FIG. 18.

After the parts have reached the position illustrated in FIG. 18, the shoe 186 may be extended in the manner previously described along with the shoe drive member 340. The layering cam that was not used in winding the coil 32 is selected before movement of the shoe toward the mandrel 62 to control the incremental movements of the shoe 186 away from the mandrel 62 during the winding of the coil 34 about the second core piece 42 since that winding is in a direction opposite to the winding of the coil 40. Further in preparation for and during the winding of the second coil, the coil forming roller 198 is urged downwardly by operation of its drive cylinder 210 so that the strapping W is trapped between the roller 198 and the core piece 42 as well as between the shoe 186 and the confronting surfaces of the mandrel 62. The winding of the second coil 34 is then accomplished by rotation of the yoke assembly 66 in a clockwise direction, as indicated by the arrow thereon in FIG. 19, with the forming head 112 in its mid-height position.

FIG. 19 shows the parts at the end of the winding of the second coil 34. The upper drive roller 198 is thereafter retracted and the transition wire portion 56 between the second coil 34 and the third coil 36 yet to be wound is accomplished by extension of the wire forming head 112 into engagement with the shoe 186. The yoke assembly 66 is then rotated by 90° in a clockwise direction, as indicated by the arrow thereon in FIG. 20 and, at the same time, the lifting cylinder 80 is energized to bias the wire forming head 112 still higher until the lifting carriage 76 reaches the other of its adjustable stops 102. With the shoe 186 rotating with the core piece 42 about which the coil 34 has been formed, the 90° clockwise rotation of the yoke assembly 66 is accompanied by a motion of the wire forming head 112 that causes it to remain adjacent the corner of the second coil 34 from which the second transition wire portion 56 extends so that the wire forming ahead 112 moves to the position thereof shown in FIG. 20 wherein its lower surface overlies the uppermost, longer dimension of the coil 34 and with its extreme free end nearly aligned with the shorter side of the coil 34 that is farthest from the wire feed assembly. This uppermost position of the wire forming head 112 is diagrammatically illustrated at 112C in FIG. 1. Although the only time it is in its uppermost position 112C, it is in overlying relation to the shoe 186 at the winding station, as shown in FIG. 20. When the wire forming head 112 reaches its position shown in FIG. 20, both sets of stops 130, 132 and 134, 136 of the wire forming drive cylinder 122 are engaged so that the wire forming head 112 is in its fully extended position.

It will be noted that the upper and lower edges of the free end of the forming head 112 are substantially parallel and are spaced apart by a distance substantially equal to the spacing between the adjacent sides of the coils 34 and 36. The combined rotation of the core piece in the clockwise direction and movement of the forming head 112 upwardly and toward the winding station causes the strapping W to be bent to conform to the arcuate leading edge surface 168 of the channel base 166.

It will be noted in FIG. 20 that a portion of the transition wire portion 56 is engaged by the transition guide pin 196. The guide pin 196 is an auxiliary device to assist in properly maintaining the position of the transition wire portion 56. As those familiar with the handling of wire being wound will appreciate, various such devices may be utilized. The pin 196 in this case ensures that the strapping properly extends in a straight path from the last turn of the coil 34 into the wire forming head 112.

After the edge bending of the transition wire portion 56, as illustrated in FIG. 20, the wire forming head 112 is retracted away from the winding station. The tooling mounting plate 194 and, with it, the shoe 186 and the shoe drive member 340 are likewise retracted. The clamp 70 is then repositioned to clamp the coil 34 and the mandrel 62 indexed by 90° about its axis in a topcoming direction, i.e. the direction of the arrow marked thereon in FIG. 21, so that the third core piece 44 is located as shown in FIG. 21 in position to receive a coil. Again, the proper layering cam is engaged by its associated cam follower in preparation for the winding of a coil around the core piece 44 in the same direction as the first coil 32. At the same time as the mandrel 62 is rotated in the topcoming direction, the wire guide head 112 is lowered to its lowest position 112A because the lower wire forming roller 204 will be utilized in forming the coil about the core piece 44. The tooling mounting plate 194 and, accordingly, the shoe 186 and the shoe drive member 340 are brought into winding position.

It will be noted in FIG. 21 that the wire finger 188 is utilized at this time. As the mounting plate 194 is advanced toward the mandrel 62, the finger 188 engages the transition wire portion 56 and holds it upwardly in position to be engaged by the shoe 186. The finger 188 thus has generally the same auxiliary purpose as the pin 196. Here it may be noted that the latter elements are shown only in FIGS. 20 and 21 because it is only at those times in the winding sequence represented by FIGS. 20 and 21 that the elements 188 and 196 are utilized. After the parts reach the position of FIG. 21, the yoke assembly 66 may be rotated in a counterclockwise direction to wind the third coil 36 in precisely the same manner as the first coil 32 was wound. The transition wire portion 58 formed after the winding of the third coil 36 may be formed in a manner identical to the formation of the first transition wire portion 54, and the winding of the fourth coil 38 will progress in exactly the same manner as the winding of the second coil 34. However, during the terminal portion of the winding of the fourth coil 38, the wire cutter assembly 142 is operated to cut the wire at the shear line 144 represented in FIG. 5. This cutting occurs before the winding is completed so that the finish wire portion 52 may be withdrawn from the wire forming head 112 prior to completion of the field winding 30. The finish wire portion 52 may harmlessly be withdrawn from the wire forming head 112 since it is relatively short and also since the wire is held firmly against the core piece 46 by the upper forming roller 198.

Although the precise sequence of operation of the various parts of the apparatus described herein may differ from machine to machine, the preferred sequence of operation of the various parts associated with the tooling mounting carriage 216 as presently preferred may be considered as beginning with the pistons of the three cylinders 240, 312 and 348 retracted in preparation for the commencement of the winding of the first coil 32 about the core piece 40. After the hook 50 is located in its position 50C engaged with the hook catch pin 190, both pistons of the mounting carriage cylinder 240 are extended to move the mounting carriage 216 to its extreme forward position, i.e. nearest the mandrel 62. The shoe carriage cylinder 312 and the shoe drive cylinder 348 are then simultaneously energized to bring the rectangular portion of the shoe 186 into surrounding relation to the core piece and also to bring the fingers 342 into engagement with the core piece 40. At about the same time, the hook 50 is latched to the mandrel 62 and the drive roller 204 is then brought into engagement with the strapping W to commence the winding operation. Throughout the winding of the first coil 32, all of the pistons associated with the cylinders 240, 312 and 348 remain extended. However, the shoe carriage cylinder 312 is under regulated pressure so that the operation of the layering cam assembly 314 causes its piston to be incrementally retracted as the shoe carriage 308 moves rearwardly to accommodate succeeding turns of the strapping W. After the parts have reached the position thereof illustrated in FIG. 17, the pistons associated with all of the cylinders 240, 312 and 348 may be retracted at about the same time. The piston associated with the shoe carriage cylinder 312 is retracted in order to permit operation of the cam follower selector cylinder 330. The parts are then in readiness to repeat the operations described above. That is, the pistons associated with the mounting carriage cylinder 240 are first extended and then the pistons associated with the shoe carriage cylinder 312 and the shoe drive cylinder 348 are energized in preparation for the winding of the second coil.

As the first turn of the second coil 34 nears completion, there is a possibility that the transition wire portion 54 might engage the upper coil forming roller 198. To preclude this possibility, it is desirable to retract the tooling mounting plate 194 and, accordingly, the drive roller 198 through a short distance (on the order of one-half of the thickness of the wire strapping W) away from the mandrel 62. Such movement can be accomplished by providing internal stops for one of the pistons associated with the tooling carriage positioning cylinder 20 so that that particular piston moves only by a distance equal to approximately one-half of the wire thickness, the other piston being responsible for a travel of the carriage 216 on the order of four inches. The foregoing operations of the cylinders 240, 312 and 348 may be repeated throughout the course of the winding procedure.

The cylinder 96 that extends and retracts the wire guide and feed assembly carriage 82 need only operate following the finish of the winding of one complete set of coils and preceding the winding of the next complete set of coils since the wire guide and feed assembly 72 need not be retracted between the winding of individual coils. The feed roller 184 that was moved out of position to permit extension of the wire guide and feed assembly carriage 82 is moved back into driving relation with respect to the wire strapping at the same time that the positioning cylinder 96 is retracted to move the wire guide and feed assembly carriage 82 rearwardly.

After the hooking of the wire hook 50 to the catch pin 190 and then to the latch pin 268, the wire strapping W is thereafter drawn from its supply as a result of being pulled by rotation of the mandrel 62. It will be noted that the mandrel 62 occupies alternately horizontal and vertical positions at the end of the winding of the coils. Prior to the subsequent retraction of the tooling mounting plate 194 and the shoe 186 in preparation for the indexing rotation of the mandrel 62, the shot pin 296 is brought into engagement with the notch 302 aligned therewith to retain the position of the winding shoe 186 so that it stays properly aligned with the core pieces. The alignment at the end of the winding of one coil is the same as the alignment at the beginning of the winding of the next coil because, as illustrated in FIGS. 15 through 21, the yoke assembly 66 does not rotate after the shoe 186 is retracted from the winding station. Instead, the only rotation is of the mandrel 62 about its major axis.

The forming roller 198 or 204 that is engaged with the wire strapping W during the winding of a coil is constantly biased by its associated positioning cylinder 210 or 212 toward the center of the core piece about which the coil is being wound so that it can follow the contours of both the longer and shorter sides of the coils as well as the corners of the coils. The lowest position of the wire forming head 112 is utilized in every case with the lower coil forming roller 204, the wire forming head 112 being in its mid-position 112B when coils are wound utilizing the upper forming roller 198.

After all four coils are wound, the completed windings along with their core pieces may be removed and other core pieces assembled onto the mandrel 62 in preparation for the winding of another set of coils. At this time, the mandrel 62 is properly reoriented in preparation for a repetition of the operations described above.

Although the presently preferred embodiment of this invention has been described, it will be understood that within the purview of this invention various changes may be made within the scope of the appended claims.

Having thus described our invention, we claim:

1. In apparatus for manufacturing dynamoelectric windings having plural coils and continuous transition portions extending uninterruptedly between the coils, said apparatus being of the type comprising a mandrel having a major axis and a plurality of core pieces spaced about said major axis, means for rotating said mandrel about said major axis to selectively present said core pieces to a winding station, means for edge winding strapping about that core piece then presented at said winding station including means for rotating said mandrel about a second axis inclined from said major axis for drawing said strapping from a source of strapping to edge bend said strapping to form a coil about the one of said core pieces present at said winding station, the improvement comprising a wire feed and guide assembly for guiding strapping from said source of strapping to said mandrel at said winding station, said assembly having a wire forming head through which said strapping extends to the winding station constructed and operable to supply strapping to said winding station and cooperate with said means for rotating said mandrel about said second axis for edge bending said strapping to form coils on said core pieces, and said assembly including means for moving said wire forming head both vertically and horizontally for cooperating with said means for rotating said mandrel about said second axis to edge bend transition strapping portions after the winding of a coil on one of said core pieces and before the winding of the next coil on another of said core pieces.

2. In an apparatus according to claim 1 wherein said wire forming head includes means defining a channel for receiving the strapping including means defining an arcuately curved surface at the end of said channel nearest said mandrel at said winding station along which said transition strapping portions are edge bent, and means for retaining strapping for movement along said channel.

3. In an apparatus according to claim 1 wherein said wire feed and guide assembly further comprises carriage support means, a vertically movable carriage mounted on said carriage support means, strapping guide means affixed to said carriage comprising an elongate guide member having a groove that receives and guides strapping to said wire forming head retaining strapping for movement along said groove, and means mounting said wire forming head for movement in a horizontal direction on said vertically movable carriage; and wherein said means for moving said wire forming head both vertically and horizontally comprises means for moving said vertically movable carriage relative to said carriage support means, and means for moving said wire forming head relative to said vertically movable carriage.

4. In an apparatus according to claim 3 wherein said apparatus includes a machine bed, wherein said carriage support means comprises a horizontally movable carriage, said assembly further having means for moving said horizontally movable carriage relative to said machine bed.

* * * * *